3,255,205
PRODUCTION OF INDOLES
Gene C. Robinson, Baton Rouge, La., assignor to Ethyl Corporation, New York, N.Y., a corporation of Virginia
No Drawing. Filed Dec. 23, 1963, Ser. No. 332,926
9 Claims. (Cl. 260—319)

This invention relates to a novel process for the preparation of indoles. More particularly, this invention relates to a process whereby substituted indoles are produced efficiently and in high yields.

By indole it is meant one of a group of organic heterocyclic compounds in which a benzene ring is fused to a pyrrole ring according to the following formula:

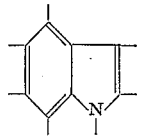

At present indoles synthesis are conducted by fusing a 5-membered N-heterocycle on a benzoic compound. Representative of the known processes is the Fisher Indole Synthesis, whereby a phenol hydrazone of an aldehyde or a ketone on treatment with an acid is converted to an indole. Specifically, for example, when the starting material is the phenyl hydrazone of acetone, the product is 2-methyl indole.

An object of the present invention is to provide a process for the production of indoles which is unique and which is far more economically attractive than the processes heretofore known.

These and other objects are accomplished by contacting (i.e. effecting a reaction between) an aromatic amine and a 2,3-dihalo-3-H-propene.

The 2,3-dihalo-3-H-propene reagents, which may also be referred to as a 2,3-dihalo-1,1,3-trisubstituted propene, are characterized in that they contain a halogen substituent and a hydrogen atom on the carbon atom in the 3 position, not more than one ring fused to the molecule at the 1 and 3 position and contain from 3 to 60 carbon atoms in the molecule. This reagent is hereinafter sometimes referred to as the propene reagent.

The propene reagent may be depicted by the following structural formulas:

(I) 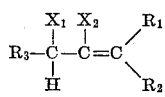

and (II) 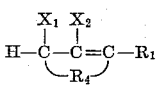

wherein $X_1$ and $X_2$ are halogen atoms and may be the same or different. $R_1$, $R_2$, and $R_3$ are each hydrogen, an inorganic radical or an organic radical having from 1 to about 20 carbon atoms and preferably from 1 to about 10 carbon atoms. The propene reagent contains from 3 to about 60 carbon atoms and preferably from 3 to about 30 carbon atoms in the total molecule. A wide variety of inorganic radicals can be employed, for instance, halides, amino groups, hydroxyl groups, and the like. Preferably $R_1$, $R_2$, $R_3$ are each selected from the group consisting of hydrogen, alkyl, cycloalkyl, alkenyl, cycloalkenyl, aryl, aralkyl, aralkenyl, alkoxy, cycloalkoxy, alkynoxy, aryloxy, aralkoxy and aralkynoxy radicals. The aforesaid hydrocarbon and hydrocarboxy radical may contain substituents such as halogens, hydroxyl groups, amino groups, and the like, and the said hydrocarbon and said hydrocarboxy radicals may contain up to about 4 divalent functional groups in the carbon chain selected from the group consisting of

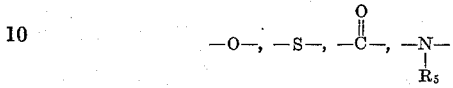

wherein $R_5$ is hydrogen or a hydrocarbon radical having from 1 to 20 carbon atoms. $R_4$ (Formula II) is a bivalent hydrocarbon group characterized by being from 1 to about 17 carbon atoms in length; by containing a total of from 1 to about 50 carbon atoms in the substituents, if present thereon (such substituents being selected from the group consisting of alkyl, cycloalkyl, aryl, aralkyl, cycloalkenyl, and aralkenyl, such substituents individually containing 1 to about 20 carbon atoms and most preferably 1–10 carbon atoms); by being composed of a chain of saturated carbon atom(s) or a chain of olefinically unsaturated carbon atoms either of which may be substituted by one or more of (a) said hydrocarbon substituents and/or (b) functional groups selected from the group consisting of hydroxyl, amino, halides, functionally substituted hydrocarbon groups which themselves contain such functional groups, alkoxy, cycloalkoxy, aryloxy, alkenoxy, cycloalkenoxy, aryloxy, and aralkenoxy groups (the foregoing hydrocarboxy groups may themselves be substituted with any of said functional groups); and by containing in the above described bivalent hydrocarbon group from 0 to about 4 (i.e. up to about 4) divalent groups taken from the following:

and

wherein $R_3$ is either hydrogen or a hydrocarbon group containing from 1 to about 24 carbon atoms. Thus when the chain is a saturated chain it is an alkylene group which may or may not be interrupted at one or more portions thereof by one or more of the isolated divalent groups depicted and described above. On the other hand when the chain is an olefinically unsaturated chain it will generally contain from 1 to about 4 isolated ethylenic double bonds and in addition, this chain may likewise be so interrupted. Generally speaking, $R_4$ is preferably a bivalent hydrocarbon group composed solely of carbon and hydrogen atoms.

Any of a wide variety of aromatic amines may be utilized in the process of this invention, the only requirement being that the amine contain at least one hydrogen substituent on the aromatic nucleus ortho to the amino group and at least one hydrogen atom on the amino group itself. The aromatic amine may be mono- or polynuclear and may contain any of a wide variety of substituents on the nucleus and the nitrogen atom of the amino group. Preferably the aromatic amine is an aromatic monoamine containing not more than two fused benzene rings in the aromatic nucleus (that is from 6 to 10 nuclear carbon atoms) and from 6 to about 40 carbon atoms in the total molecule. The preferred amine reagent is depicted by the following structural formula:

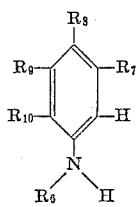

wherein each R is hydrogen, an inorganic radical such as a halide, or an organic radical having from 1 to about 20 carbon atoms and preferably 1–10 carbon atoms. Preferably $R_6$, $R_7$, $R_8$, $R_9$, and $R_{10}$ are each selected from the group consisting of hydrogen, alkyl, cycloalkyl, alkenyl, cycloalkenyl, aryl, aralkyl, aralkenyl, alkoxy, cycloalkoxy, alkynoxy, aryloxy, aralkoxy and aralkynoxy radicals. Most preferably each R is selected from the group consisting of hydrogen and alkyl groups having from 1–10 carbon atoms.

The process is to be conducted at temperatures which are sufficient to produce the desired indole product but insufficient to decompose the product. These results are achieved by conducting the process at a temperature within the range of from about 20° C. to about 300° C. and preferably from about 150° C. to about 300° C. Of course, the preferred or optimum temperature varies between these ranges depending upon the specific reagents employed.

Generally speaking, the process is conducted at autogenous pressures in a closed reaction vessel or at atmospheric pressure in a vessel equipped with a reflux condenser due to that fact that the normal reaction temperatures are above the boiling point of the reagents. The pressures will vary between 0 and 2000 p.s.i.g. depending on the boiling points of the reagents employed. The reaction pressure may be reduced substantially according to another preferred embodiment, i.e. dissolving the reagents in a high boiling hydrocarbon solvent which is inert to the reagents and product. This solvent should have a boiling point of between about 150° C. and 300° C. and preferably between 175° C. and 250° C. The solvent is generally employed in a molar excess based on the 2,3-dihalo-3-H-propene of about 10 to about 400 mole percent. Preferred solvents are hydrocarbon and ethers having 5–20 carbon atoms.

The reagents are generally employed in stoichiometric proportions due to economic considerations, i.e. 1 mole of aromatic amine to 1 mole of propene. The proportions can however range from 10:1 to 1:10 moles of amine per mole of propene. Because the amine reagent is generally more readily available it is often preferred to employ it in an excess of from about 50–350 percent to insure efficient consumption of the propene. Excellent results are achieved when the molar ratio of amine to 2,3-dihalo-3-H-propene is at least about 3:1.

In order to insure high yields it is preferred though not required to add a basic metal compound to the reaction mixture. These compounds are preferably selected from the group consisting of alkali metal oxides, alkali metal hydroxides, alkaline earth metal oxides, and alkaline earth metal hydroxides. Other suitable compounds are the alkali and alkaline earth carbonates, bicarbonates, phosphates, borates, and cyanides. These compounds are employed in a molar ratio (metal compound:2,3-dihalo-3-H-propene) of 0.1:1 to 5:1 and preferably about 3:1.

In order that those skilled in the art may better understand the process of this invention the following working examples are given by way of description and not by way of limitation.

EXAMPLE I

Into a reaction vessel equipped with a heater and a reflux condenser was charged 80 parts by weight of aniline and 20 parts by weight of 2,3-dichloropropene. The reaction mixture was heated to about 183° C. and allowed to reflux for five hours. About 52 percent of 2-methylindole was recovered. A portion of 1-methylindole was also produced.

In the following examples a procedure similar to Example I is employed except as otherwise indicated.

*Table*

[All runs conducted in a sealed vessel at ambient pressure. Molar ration of amine:2,3-dihalo-3-H-propene about 3:1 in all runs]

| Example | Gem-dihalocyclopropane | Aromatic Amine | Temp., ° C. | Product |
|---|---|---|---|---|
| II | 1,2-dichloro-4-methoxybutene-2 | Aniline | 180 | 2-methoxymethyl-3-methylindole. |
| III | 3,4-dichloro-2-methylpentene-2 [1] | ----do---- | 200 | 2-methyl-3-isopropylindole. |
| IV | 2,3-dichloro-1-methyl-cyclohexene | p-Toluidine | 173 | 4,6-dimethyl-1,2,3,4-tetrahydrocarbazole. |
| V | 2,3-dichlorocycloheptene [2] | o-Methoxyaniline | 245 | 7-methoxy-2, 3-pentamethylenoindole. |
| VI | 2,3-dibromocyclohexene [3] | 3-allylaniline | 165 | 2,3-tetramethyleno-6-allylindole. |
| VII | 2-fluoro-3-chlorocycloheptene | 4-iodoaniline | 170 | 2,3-pentamethyleno-6-iodoindole. |
| VIII | 1-phenyl-2,3-dichloropropene [4] | α-Naphthylamine | 150 | 2-phenyl-3-methyl-6,7-benzoindole. |
| IX | 2-chloro-3-bromocycloheptene | N-n-amylaniline | 299 | N-n-amyl-2,3-pentamethylenoindole. |
| X | 2,3-dichlorocyclohexene | 3-n-decyl-4-phenyl-aniline | 301 | 2,3-tetramethyleno-5-phenyl-6-n-decylindole. |

[1] Sodium hydroxide pellets added to reaction mixture.
[2] Calcium oxide flakes added to reaction mixture.
[3] Iso-octane employed as solvent.
[4] Diethylene glycol dimethyl ether added as solvent.

Exemplary of specific propene reagents which may be employed are: 1-allyl-2,3-dichloro-3-cyclohexylpropene, 1,1-diphenyl-2,3-dibromo-propene, 2,3-dichloro-3-n - decylpropene, 1,1,2,3 - tetrachloropropene, 1 - methyl - 2,3-dichloro-5-oxa-cyclohexene, 1-methyl - 2,3 - dichloro - 5-aza-cyclohexene and the like. Preferred propenes are: 2,3-dichlorocyclopropene, 1,2-dichlorobutene-2, 2,3 - dichlorocycloheptene and the like.

Exemplary of the metal compounds are sodium oxide, lithium oxide, potassium oxide, rubidium oxide, cesium oxide, beryllium oxide, magnesium oxide, calcium oxide, strontium oxide, barium oxide, sodium hydroxide, lithium hydroxide, potassium hydroxide, rubidium hydroxide, cesium hydroxide, beryllium hydroxide, magnesium hydroxide, calcium hydroxide, strontium hydroxide, barium hydroxide, sodium carbonate, lithium carbonate, potassium carbonate, rubidium carbonate, cesium carbonate, beryllium carbonate, magnesium carbonate, calcium carbonate, sodium bicarbonate, potassium bicarbonate, lithium phosphate, sodium phosphate, potassium phosphate, beryllium phosphate, magnesium phosphate, calcium phosphate, sodium borate, potassium borate, beryllium borate, magnesium borate, calcium borate, sodium cyanide, potassium cyanide, magnesium cyanide, calcium cyanide, and the like. Preferred are sodium oxide, sodium hydroxide, calcium oxide and calcium hydroxide.

Exemplary of the aromatic amines which are used in the present process are 4-isobutyl, aniline, 5-ethenyl-6-chloro-aniline, ortho-anisidine, benzidine, meta-chloroaniline, ortho-chloro-aniline, p-chloro-aniline, orthochloro-p-anisidine, 4-hydroxy aniline, ortho-dianisidine, 2,5-dichloroaniline, 3,3'-dichlorobenzidine, N-ethyl-alpha-naphthyl amine, N-ethyl-ortho-toluidine, alpha-naphthyl amine, beta-naphthyl amine, ortho-toluidine, p-toluidine, 6-phenoxy aniline, 4-cyclohexyl aniline, and the like. The preferred aromatic amine is aniline.

The following are solvents which may be employed if desired in this process: nonane, isopropyl benzene, alpha-pinene, isoamyl, ether, decane, decahydronaphthalene, dimethyl naphthalene, naphthalene, diethylene, glycol dimethyl ether, dibutyl maleate, benzyl ether, dibutyl phthalate, and dibutyl sebacate.

The indoles produced according to this process are known to have many diverse uses such as the production of amino acids and synthetic dyes. Also derivatives of these compounds can be used as a microchemical reagent for cellulose and in perfumery.

What I claim as new and desire to secure by Letters Patent of the United States is as follows:

I claim:
1. The process of producing an indole comprising reacting at a temperature from about 20° C. to about 300° C. (a) an aryl monoamine having an aryl nucleus containing up to two aryl rings, a hydrogen ortho to the amine group, a hydrogen in the amine group, and no more than about 40 carbons, with (b) a 2,3-dihalo-3-H-propene containing up to 60 carbons, to cause said propene to become linked to the amine group and to said ortho position of said amine.
2. The process of claim 1 conducted at a temperature of about 150° C. to about 300° C.
3. The process of claim 1 wherein a basic metal compound is added to the reaction mixture, said basic metal compound being selected from the group consisting of alkali and alkaline earth metal oxides and hydroxides.
4. The process of claim 1 conducted in an organic solvent having a boiling point between about 150° C. and 300° C.
5. The process of claim 1 wherein said aromatic amine is aniline.
6. The process of claim 1 wherein said 2,3-dihalo-3-H-propene is 2,3-dichloropropene.
7. The process of claim 1 wherein said 2,3-dihalo-3-H-propene is 1,2-dichloro-butene-2.
8. The process of claim 1 wherein said 2,3-dihalo-3-H-propene is 2,3-dichlorocycloheptene.
9. A process for producing 2-methyl-indole comprising reacting aniline and 2,3-dichloropropene in the liquid phase at a temperature of from about 150° C. to about 300° C.

References Cited by the Examiner

UNITED STATES PATENTS 2,765,320   10/1965   Bader et al. _____ 260—319

OTHER REFERENCES

Elderfield (editor): Heterocyclic Compounds, vol. 3, John Wiley & Sons, Inc., New York, 1952, pages 32–41.

HENRY R. JILES, *Acting Primary Examiner.*

MARY O'BRIEN, *Assistant Examiner.*